United States Patent [19]

Okitsu et al.

[11] Patent Number: 4,475,998

[45] Date of Patent: Oct. 9, 1984

[54] MODIFIED EPOXY (METH) ACRYLATE RESIN AND HARDENABLE RESIN COMPOSITION CONTAINING THE SAME

[75] Inventors: Kiyoshi Okitsu; Takaaki Murai, both of Hiroshima, Japan

[73] Assignee: Daicel Chemical Industries, Ltd., Osaka, Japan

[21] Appl. No.: 534,863

[22] Filed: Sep. 22, 1983

[30] Foreign Application Priority Data

Sep. 22, 1982 [JP] Japan .................. 57-165669
Sep. 28, 1982 [JP] Japan .................. 57-169180

[51] Int. Cl.$^3$ ............... C08G 63/08; C08G 59/40; C08F 8/00
[52] U.S. Cl. ................. 204/159.15; 204/159.18; 528/112; 528/116; 528/354
[58] Field of Search ............... 528/112, 116, 354; 204/159.15, 159.18, 159.30

[56] References Cited

U.S. PATENT DOCUMENTS

| | | | |
|---|---|---|---|
| 3,377,406 | 4/1968 | Newey et al. | 528/112 |
| 3,450,613 | 6/1969 | Steinberg | 528/112 |
| 4,368,320 | 1/1983 | Aldinger et al. | 528/354 |
| 4,404,075 | 9/1983 | Ikeda et al. | 204/159.23 |

Primary Examiner—Herbert S. Cockeram
Attorney, Agent, or Firm—Sughrue, Mion, Zinn, Macpeak, and Seas

[57] ABSTRACT

A lactone-modified epoxy (meth)acrylate resin is disclosed as is a hardenable resin composition which includes the lactone-modified epoxy resin. The lactone-modified epoxy (meth)acrylate resin is obtained by addition polymerizing 3 to 95 parts by weight of a lactone to 97 to 5 parts by weight of an epoxy (meth)acrylate resin at the whole or a part of the secondary hydroxy groups thereof. The hardenable resin composition comprises (A) 5 to 95 parts by weight of the above referred to lactone-modified epoxy (meth)acrylate resin, (B) 95 to 5 parts by weight of a vinyl compound having an ethylenically unsaturated bond, and (C) 0 to 10 parts by weight of a photosensitizer.

14 Claims, No Drawings

MODIFIED EPOXY (METH) ACRYLATE RESIN AND HARDENABLE RESIN COMPOSITION CONTAINING THE SAME

FIELD OF THE INVENTION

The present invention relates to modified epoxy acrylate or methacrylate resins containing primary hydroxy groups having an excellent reactivity, obtained by ring-opening polymerizing lactone compounds with epoxy acrylate or methacrylate resins at the secondary hydroxy groups thereof, which have a low viscosity and excellent flexibility and wherein the reactivity of the hydroxy groups is utilizable, and to hardenable resin compositions containing the same which can provide a hardened layer having an excellent flexibility by hardening upon irradiation with radiations.

BACKGROUND OF THE INVENTION

Radiation-hardenable resin compositions which are hardened by irradiating with radiations such as ultraviolet rays, electron beams, etc. have been developed for various utilities including printings, paints, electrical insulation, etc. and put into practical uses. The advantages reside in that (1) the compositions are employed in the absence of any solvent and less pollution; (2) the hardening rate is rapid making it possible to quickly reproduce articles; (3) they are hardened as a 100% solid so that a change in volume is extremely small before and after the hardening; (4) there is no thermal loss depending upon material or no thermal influence on material, etc. and, various paints and adhesives for plastics, paper, wood, inorganic materials, etc. have also been developed. Radiation-hardenable paints, inks, adhesives, etc. having such characteristics exhibit excellent properties in adhesion, water resistance, heat resistance, etc.

Epoxy (meth)acrylate resins obtained by ring-opening reacting epoxy resins at the epoxy groups thereof with acrylic acid or methacrylic acid involve various resins including bisphenol A type epoxy (meth)acrylate resins and have been employed for various utilities utilizing the excellent reactivity of the (meth)acrylate group thereof. However, such resins are rigid and brittle. When these resins are used as inks for paper, a crack is caused in the ink when the paper is bent. Further, when utilized as paints on a metal plate such as iron, aluminum, etc., processing for bending of a plate on which the paints are coated results in cracking of the coated layer so that processing is impossible.

By radical polymerization of epoxy (meth)acrylate resins dissolved in styrene using organic peroxides, the resulting polymers are employed for corrosion-resistant FRP and the field relating to resin concretes. Further, by irradiating epoxy (meth)acrylate resins dissolved in a reactive diluent such as styrene or acrylic acid esters with ultraviolet rays or the like in the presence of a sensitizer or by irradiating with electron beams in the absence of any sensitizer, the resins can be hardened in an extremely short period of time and can be used for paints, adhesives, vehicles for printing ink, solder resist inks, relief printing materials, linings for mortar-made floor, coatings for polyvinyl chloride-made tiles, etc.

Although the resins are utilized in many ways, they have various shortcomings such that they are rigid and brittle, have a high viscosity and provide poor workability.

SUMMARY OF THE INVENTION

As a result of extensive investigations attempting to improve such shortcomings of epoxy (meth)acrylate resins and further broaden the possibility of epoxy (meth)acrylate resins, the present inventors have found that by ring-opening polymerizing lactones with epoxy (meth)acrylate resins at the secondary hydroxy groups thereof, an appropriate degree of flexibility is imparted to rigid and brittle epoxy (meth)acrylate resins and at the same time, the viscosity of epoxy (meth)acrylate resins is greatly decreased, the workability is improved; further, the whole or a part of the secondary hydroxy groups having poor reactivity are converted into primary hydroxy groups having good reactivity at the terminals of the lactone side chain and further, the primary hydroxy groups are present far from the rigid resin skeleton so that the reactivity of the hydroxy groups with a hardening agent can be utilized.

That is, the present invention provides a lactone-modified epoxy acrylate or lactone-modified epoxy methacrylate resin obtained by ring-opening polyaddition of 3 to 95 parts by weight of a lactone to 97 to 5 parts by weight of an epoxy acrylate or epoxy methacrylate resin at the whole or a part of the secondary hydroxy groups thereof, the epoxy acrylate or epoxy methacrylate resin being obtained by reacting an epoxy resin having at least one epoxy group at the whole or a part of the epoxy group(s) thereof with acrylic acid or methacrylic acid.

The invention also provides a hardenable resin composition which includes (A) 5 to 95 parts by weight of the above referred to lactone-modified epoxy acrylate or lactone-modified epoxy methacrylate resin, (B) 95 to 5 parts by weight of a vinyl compound having an ethylenically unsaturated bond, and (C) 0 to 10 parts by weight of a photosensitizer.

DETAILED DESCRIPTION OF THE INVENTION

As a means of imparting flexibility of epoxy (meth)acrylate resins, there has been heretofore adopted a method for adding thereto mainly a plasticizer. However, the method involved bleeding of the plasticizer and deterioration of physical properties such as water-resistance, heat resistance, etc.

As compared thereto, the epoxy (meth)acrylate resin of the present invention involves no bleeding phenomenon of a plasticizer, and hardly causes deterioration in various physical properties unlike the externally plasticizing method for adding a plasticizer. Flexibility is imparted to the epoxy (meth)acrylate resins by adding a lactone, e.g., ε-caprolactone, to the epoxy (meth)acrylate resins at the secondary hydroxy groups thereof. Further, epoxy (meth)acrylate resins are generally highly viscous so that (meth)acrylic acid esters having strong irritability to the skin should be used in large amounts as diluting agents; however, the epoxy (meth)acrylate resins of the present invention have a low viscosity so that it is possible to minimize the amount of diluting agents such as (meth)acrylic acid esters, etc., having strong irritability to the skin, to be used and improve the workability.

The epoxy (meth)acrylate resins employed in the present invention are those obtained by reacting epoxy compounds having at least one epoxy group with acrylic acid or methacrylic acid with heating, in the presence or absence of a ring-opening catalyst for the epoxy group(s) and if desired, in the presence of a polymerization inhibitor, a solvent or a reactive diluting agent.

The epoxy compounds as used herein which are employed for the epoxy (meth)acrylate resins include epoxy resins of glycidyl ether type obtained from bisphenol A and epichlorohydrin, e.g., trademarks Epikote 827 and Epikote 1001, manufactured by Shell International Chemicals Corp., etc. or products corresponding thereto manufactured by other companies and, are fully explained in Japanese Patent Application (OPI) No. 164116/82. The term "OPI" as used herein refers to a "published unexamined Japanese patent application". Further, the epoxy compounds include epoxy resins of CL-modified glycidyl ether type obtained by adding ε-CL to epoxy resins of this glycidyl ether type, e.g., trademarks Placcel GL-61, Placcel GL-62, Placcel G-101 and Placcel G-102, manufactured by Daicel Chemical Industries, Ltd., etc.; epoxy resins of type obtained by adding alkylene oxides to bisphenol A and further reacting with epichlorohydrin, e.g., trademark, EP-4000, manufactured by Asahi Denka Co., Ltd., etc.; resins obtained using methylepichlorohydrin in place of epichlorohydrin, e.g., trademark Epiclon 800, manufactured by Dainippon Ink Co., Ltd., etc.; in addition, epoxy compounds obtained using phenol novolaks or cresol novolaks as a base, diglycidylterephthalic acid, 3,4-epoxycyclohexylmethyl-3,4-epoxycyclohexylcarboxylate (trademark Celloxide 2021, etc., manufactured by Daicel Chemical Industries, Ltd.) known as alicyclic epoxy resins, resins using phthalic acid or hexahydrophthalic acid as a base, e.g., trademark Shodain 508, manufactured by Showa Denko Kabushiki Kaisha, etc. Among them, Epikote 827, Epikote 1001, Placcel GL-61, Placcel GL-62, Placcel G-101, Placcel G-102, diglycidylterephthalic acid, and Celloxide 2021 are preferably used. In the reaction, a stoichiometric ratio of the epoxy compounds to acrylic acid or methacrylic acid ranges from 1/0.6 to 1/1.5.

As lactones employed in the present invention, propiolactones having a 4-membered ring and caprolactones having a 7-membered ring can be generally employed but ε-caprolactone is particularly preferred.

ε-Caprolactone is industrially manufactured by oxidizing cyclohexanone with peracetic acid by the Beyer-Billiger reaction.

A proportion of the epoxy (meth)acrylate resin to the lactone-modified epoxy (meth)acrylate resin of the present invention is 97 to 5 parts by weight, preferably 95 to 30 parts by weight, based on the total 100 parts by weight. The reason is that when the proportion is too large, a sufficient, desired flexibility cannot be obtained; conversely when it is too small, resins are overly soft.

Ring-open polymerization of the lactone into the secondary hydroxy groups of the epoxy (meth)acrylate resin is carried out at 70° to 170° C., preferably 80° to 150° C. When the temperature is lower than 70° C., the reaction rate is small and, when it is higher than 170° C., the epoxy (meth)acrylate resin is gelled.

It is preferable to use a catalyst for this reaction. Useful catalysts include titanium compounds such as tetrabutyl titanate, tetrapropyl titanate, tetraethyl titanate, etc.; organic tin compounds such as tin octylate, dibutyl tin oxide, dibutyl tin dilaurate, etc.; further tin halides such as stannous chloride, stannous bromide and stannous iodide. The amount to be used ranges from 1000 ppm to 0.01 ppm, preferably 500 ppm to 0.2 ppm.

Upon the reaction, it is preferred to incorporate hydroquinone, monomethoxyhydroquinone, p-tert-butyl catechol, phenothiazine, etc. in an amount of 2 to 0.01%, as radical polymerization inhibitors.

The reaction may be carried out in the absence of any solvent or may also be carried out in a solvent having no active hydrogen, such as toluene, xylene, methyl ethyl ketone, methyl isobutyl ketone, etc. However, solvents having an ester bond are not generally preferred. This is because there is a fear that such solvents might cause an ester exchange reaction with the ester group of a polycaprolactone and a polycaprolactone not bound to the epoxy acrylate resin might be formed.

When a stannous halide is employed as a catalyst, the ester exchange reaction is hardly accelerated and it is thus possible to employ an ester type solvent. However, when titanium type catalysts are employed, it is desired that ester type solvents be particularly avoided because such solvents accelerate the ester exchange reaction.

The resins obtained can be used as is for purposes as described below and can also be used as a component (A) in a resin composition.

The thus obtained lactone-modified epoxy resins are applicable to utilities for corrosion resistant FRP or fields relating to resin concretes, by dissolving the resins in styrene and radical-polymerizing using organic peroxides. Further, by irradiating the lactone-modified epoxy (meth)acrylate resin dissolved in styrene or a reactive diluting agent such as acrylic acid esters with ultraviolet rays, etc. in the presence of sensitizers, or by irradiating such with electron beams in the absence of any sensitizer, the resins can be hardened for an extremely short period of time and, are provided for utilities of paints, adhesives, vehicles for printing ink, solder resist inks, relief printing materials, linings for mortar-made floor, coatings for polyvinyl chloride-made tiles, etc.

As indicated above, the lactone-modified epoxy (meth)acrylate resins obtained can be used as is or as a component (A) in a resin composition. The resin composition will now be explained in detail.

To 95 to 5 parts by weight, preferably 20 to 80 parts by weight, of the thus obtained lactone-modified epoxy (meth)acrylate resins, 95 to 5 parts by weight, preferably 80 to 20 parts by weight, of a vinyl compound having an ethylenically unsaturated bond is added. When the amount of lactone-modified epoxy (meth)acrylate resin is small, adhesion, heat resistance and flexibility are not sufficiently imparted to a hardened, coated layer; further when it is too large, it becomes difficult to handle the resin due to high viscosity, or the hardening rate becomes slow, in some cases.

The vinyl compound having an ethylenically unsaturated bond which is employed in the present invention is a low viscosity liquid compound having a radical polymerizable double bond, which is shown by general formula (I) and represented by acrylic acid ester or methacrylic acid ester compounds, styrene, N-vinylpyrrolidone, etc.

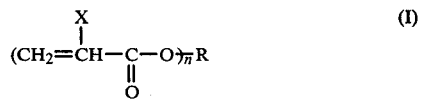

wherein X is H or —CH$_3$; n is an integer of 1 to 8; and R is a residue of n-functional alcohol.

Representative examples of acrylic acid or methacrylic acid esters include the following:

Mono functional (meth)acrylic acid esters such as 2-hydroxyethyl acrylate, 2-hydroxyethyl methacrylate, 3-hydroxypropyl acrylate, 3-hydroxypropyl methacrylate, tetrahydrofurfuryl alcohol acrylic acid ester, phenoxyethyl acrylate, etc.; bifunctional (meth)acrylic acid esters such as 1,6-hexanediol diacrylate, 1,6-hexanediol dimethacrylate, propyleneglycol diacrylate, propyleneglycol dimethacrylate, neopentylglycol diacrylate, etc.; trifunctional (meth)acrylic acid esters such as trimethylolpropane triacrylate, pentaerythritol triacrylate, etc.

These vinyl compounds having an ethylenically unsaturated bond are employed alone or in admixture.

The term "radiation" as used in the present invention refers to a source of all radiations which form a free radical and induce addition polymerization of a vinyl bond. Suitable actinic rays are those having a wavelength of 2000 to 7500 Å, preferably 2000 to 4000 Å.

A kind of actinic rays which are useful herein is ultraviolet rays. Other forms of actinic rays include sunlight and those generated from a carbon arc lamp, a mercury vapor lamp, etc. as generating from an artificial light source. A preferred electron beam system is one that a direct electron curtain generates from a linear cathode.

The radiation-hardenable resin composition of the present invention may contain an effective amount of a photosensitizer when the composition is photohardened. The amount of the photosensitizer used is generally from about 0.01 to 10 wt%, preferably about 0.1 to 5 wt%, based on the weight of the resin composition. These photosensitizers and their hardening procedure are well known in the art. Examples of the photosensitizers include benzophenone, acetophenonebenzyl, benzyl dimethyl ketone, benzoin, benzoin methyl ether, benzoin ethyl ether, benzoin isopropyl ether, benzoin isobutyl ether, dimethoxyacetophenone, diethoxyacetophenone, dimethoxyphenylacetophenone, diphenyl disulfide, α-alkylbenzoins, etc.

These photosensitizers may also contain a synergestic agent for intensifying the conversion of light absorption energy into a polymerization-initiating free radical, e.g., tertiary amines.

When the hardenable resin composition is hardened by irradiation of electron beams, it is not necessarily required to add a sensitizer thereto.

The resin composition of the present invention may further contain other additives, if desired, such as various thermal polymerization inhibitors, surface active agents, ultraviolet ray absorbers, matting agents, thixotropic agents, dyestuffs, pigments, etc. Further various thermoplastic resins, thermosetting resins, etc. may also be formulated in the composition.

The composition of the present invention can be hardened by coating it onto a base plate as a thin layer. Methods for forming a thin layer include spraying, brushing, immersion and roll coating. It is preferred that hardening be conducted in an inert gas (e.g., nitrogen gas) atmosphere but hardening can also be effected under aerial atmosphere.

The hardenable resin composition in accordance with the present invention are applicable to many industrial fields such as various coating fields including ink, plastic paints, paper printing, film coating, metal coating, furniture coating, etc.; to FRP, linings and, further to insulating varnish, insulating sheets, laminate plates, print base plates, resist ink, semi-conductor sealing agents, etc. in the electronic field.

The present invention will be described below in more detail with reference to the examples below, wherein parts are by weight. However, the scope of the invention is not limited to the examples.

SYNTHESIS EXAMPLE

In a five-necked flask equipped with an air introducing tube, a thermometer, a cooling tube, a dropping funnel and a stirring apparatus, 1088.5 parts of acrylic acid, 18.4 parts of triethylamine as a catalyst and 1.84 parts of hydroquinone monomethyl ether as a polymerization inhibitor were charged. While maintaining the reaction temperature at 85°±5° C. with blowing air through the flask, 2590 parts of Araldite GY 250 (trademark of an epoxy resin manufactured by Ciba Geigy AG; epoxy equivalent, 180 to 190) was added dropwise over about 5 hours. After completion of the dropwise addition, the reaction was conducted at 90° C. for about 24 hours to obtain a resin having an acid value of 2.80 mg KOH/g, 0.09% of oxylane oxygen and a viscosity of about 2,000,000 CP/25° C.

EXAMPLE 1

In a four-necked flask equipped with an air introducing tube, a thermometer, a cooling tube and a stirring apparatus, 2400 parts of the epoxy acrylate resin synthesized in Synthesis Example, 600 parts of ε-caprolactone, 0.003 part of stannous chloride and 0.3 part of hydroquinone monomethyl ether were charged. While blowing air therein, the reaction was conducted at 120° C. for 30 hours, whereby the unreacted ε-CL became 0.2%. The resulting resin had an acid value of 6.21 mg KOH/g, a viscosity of 200,000 CP/25° C. and an appearance of Gardner 1.

EXAMPLES 2 AND 3

Using the same equipment as in Example 1, ε-caprolactone was reacted with the epoxy acrylate resin synthesized in Synthesis Example in various proportions to obtain lactone-modified epoxy acrylate resins.

The results are shown in Table 1.

TABLE 1

| | Synthesis Example | Example 1 | Example 2 | Example 3 |
|---|---|---|---|---|
| Formulation: | | | | |
| Epoxy acrylate resin Note (1) | 100 | 2400 | 1950 | 1500 |
| ε-Caprolactone | | 600 | 1050 | 1500 |
| Stannous Chloride | | 0.003 | 0.003 | 0.003 |
| Reaction Condition: | | | | |
| Reaction Temperature (°C.) | | 120 | 120 | 120 |
| Reaction Time (hrs) | | 30 | 32 | 34 |
| Property: | | | | |
| Appearance (Gardner) | 1 | 1 | 1 | 1 |
| Acid Value (mg KOH/g) | 2.80 | 6.21 | 5.22 | 4.22 |
| Viscosity (CP/25° C.) | 2,000,000 | 200,000 | 41,900 | 13,800 |

Note (1)
Epoxy acrylate resin synthesized in Synthesis Example 1.

COMPARATIVE EXAMPLE 1 AND EXAMPLES 4 TO 6

Using the epoxy acrylate resins obtained in Synthesis Example and Examples 1 to 3 in combination with a representative diluting monomer and a sensitizer, coating was carried out onto an iron base plate in a thickness of 15 μm, followed by irradiation with ultraviolet rays using a high pressure mercury vapor lamp (output: 80 W/cm) at a distance of 10 cm and at a belt speed of 2 m/mm. Thus, hardened, coated layers were obtained. The results are shown in Table 2.

TABLE 2

|  | Comparative Example 1 | Example 4 | Example 5 | Example 6 |
|---|---|---|---|---|
| Epoxy acrylate resin | Synthesis Example | Example 1 | Example 2 | Example 3 |
|  | 50 | 50 | 50 | 50 |
| Trimethylolpropane triacrylate | 30 | 30 | 30 | 30 |
| Pentaerythritol triacrylate | 10 | 10 | 10 | 10 |
| N—Vinylpyrrolidone | 10 | 10 | 10 | 10 |
| Sensitizer Note (1) | 2 | 2 | 2 | 2 |
| Viscosity (CP/25° C.) | 1490 | 1030 | 780 | 670 |
| Finger touch drying | 5 secs. | 5 secs. | 5 secs. | 5 secs. |
| Hardening time | 5 secs. | 5 secs. | 5 secs. | 5 secs. |
| Surface hardness | 2H | 2H | H | H |
| Adhesive property | good | good | good | good |
| Bendability | poor | good | good | good |

Note (1) Benzyl dimethyl ketal

EXAMPLES 7 TO 9

With 50 parts of the lactone-modified epoxy acrylate resins synthesized in Examples 1 to 3, 20 parts of trimethylolpropane triacrylate (TMPTA), 20 parts of 1,6-hexanediol diacrylate (HDDA), 10 parts of N-vinylpyrrolidone (N-VP), and 2 parts of benzoin isobutyl ether were mixed, and evaluation was conducted as in Examples 4 to 6. The results are shown in Table 3.

TABLE 3

|  | Example 7 | Example 8 | Example 9 |
|---|---|---|---|
| Resin Used | Example 1 | Example 2 | Example 3 |
| Surface hardness | 2H | 2H | H |
| Adhesion | good | good | good |
| Bendability | good | good | good |

EXAMPLES 10 THRU 12

With 50 parts of the lactone-modified epoxy acrylate resins synthesized in Examples 1 to 3, 20 parts of HDDA, 20 parts of dipentaerythritol hexaacrylate, 10 parts of N-VP and 2 parts of benzyl dimethyl ketal were mixed, and evaluation was conducted as in Examples 4 through 6. The results are shown in Table 4.

TABLE 4

|  | Example 10 | Example 11 | Example 12 |
|---|---|---|---|
| Resin Used | Example 1 | Example 2 | Example 3 |
| Surface hardness | 2H | 3H | 3H |
| Adhesion | good | good | good |
| Bendability | good | good | good |

COMPARATIVE EXAMPLES 2 AND 3

Physical properties were evaluated under the same formulation conditions and hardening conditions as those in Examples 7 and 10, respectively, except that the epoxy acrylate resins synthesized in Synthesis Example were employed in place of the lactone-modified epoxy acrylate resins synthesized in Example 1. The results are shown in Table 5.

TABLE 5

|  | Comparative Example 2 | Comparative Example 3 |
|---|---|---|
| Surface hardness | 2H | 3H |
| Adhesion | good | good |
| Bendability | poor | poor |

As shown above, bendability was obviously improved in the case of the lactone-modified epoxy acrylate resins.

While the invention has been described in detail and with reference to specific embodiment thereof, it will be apparent to one skilled in the art that various changes and modifications can be made therein without departing from the spirit and scope thereof.

What is claimed is:

1. A lactone-modified epoxy acrylate resin, obtained by addition polymerizing 3 to 95 parts by weight of a lactone to 97 to 5 parts by weight of an epoxy acrylate resin at the whole or a part of the secondary hydroxy groups thereof.

2. A lactone-modified epoxy methacrylate resin, obtained by addition polymerizing 3 to 95 parts by weight of a lactone to 97 to 5 parts by weight of an epoxy methacrylate resin at the whole or a part of the secondary hydroxy groups thereof.

3. A lactone-modified epoxy acrylate resin as claimed in claim 1, wherein said epoxy acrylate resin is an epoxy acrylate resin obtained by reacting an epoxy resin having at least one epoxy group at the whole or a part of the epoxy group or groups thereof with acrylic acid.

4. A lactone-modified epoxy methacrylate resin as claimed in claim 2, wherein said epoxy methacrylate resin is an epoxy methacrylate resin obtained by reacting an epoxy resin having at least one epoxy group at the whole or a part of the epoxy group or groups thereof with methacrylic acid.

5. A lactone-modified epoxy acrylate resin as claimed in claim 1, wherein said lactone is ε-caprolactone.

6. A lactone-modified epoxy methacrylate resin as claimed in claim 2, wherein said lactone is ε-caprolactone.

7. A lactone-modified epoxy acrylate resin as claimed in claim 1, wherein the addition polymerization is carried out at a temperature in the range of 70° to 170° C.

8. A lactone-modified epoxy methacrylate resin as claimed in claim 1, wherein the addition polymerization is carried out at a temperature in the range of 70° to 170° C.

9. A lactone-modified epoxy acrylate resin as claimed in claim 1, wherein the addition polymerization is carried out in the presence of a catalyst and a radical polymerization inhibitor.

10. A lactone-modified epoxy methacrylate resin as claimed in claim 2, wherein the addition polymerization is carried out in the presence of a catalyst and a radical polymerization inhibitor.

11. A hardenable resin composition, comprising:
    (A) 5 to 95 parts by weight of a lactone-modified epoxy acrylate resin, obtained by addition polymerizing 3 to 95 parts by weight of a lactone to 97 to 5 parts by weight of an epoxy acrylate resin at the whole or a part of the secondary hydroxy groups thereof;
    (B) 95 to 5 parts by weight of a vinyl compound having an ethylenically unsaturated bond; and
    (C) 0 to 10 parts by weight of a photosensitizer.

12. A hardenable resin composition, comprising:
    (A) 5 to 95 parts by weight of a lactone-modified epoxy methacrylate resin, obtained by addition polymerizing 3 to 95 parts by weight of a lactone to 97 to 5 parts by weight of an epoxy methacrylate resin at the whole or a part of the secondary hydroxy groups thereof;
    (B) 95 to 5 parts by weight of a vinyl compound having an ethylenically unsaturated bond; and
    (C) 0 to 10 parts by weight of a photosensitizer.

13. A hardenable resin composition as claimed in claim 11, wherein said epoxy acrylate resin is an epoxy acrylate resin obtained by reacting an epoxy resin having at least one epoxy group at the whole or a part of the epoxy group or groups thereof with acrylic acid.

14. A hardenable resin composition as claimed in claim 12, wherein said epoxy methacrylate resin is an epoxy methacrylate resin obtained by reacting an epoxy resin having at least one epoxy group at the whole or a part of the epoxy group or groups thereof with methacrylic acid.

* * * * *